(12) United States Patent
Elsayad

(10) Patent No.: US 12,039,141 B2
(45) Date of Patent: Jul. 16, 2024

(54) TRANSLATING INTERACTIONS ON A TWO-DIMENSIONAL INTERFACE TO AN ARTIFICIAL REALITY EXPERIENCE

(71) Applicant: Meta Platforms Technologies, LLC, Menlo Park, CA (US)

(72) Inventor: Alex Elsayad, Toronto (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/936,490

(22) Filed: Sep. 29, 2022

(65) Prior Publication Data

US 2024/0111390 A1    Apr. 4, 2024

(51) Int. Cl.

| G06F 3/04815 | (2022.01) |
|---|---|
| G06F 3/0346 | (2013.01) |
| G06F 3/04842 | (2022.01) |
| G06F 3/04845 | (2022.01) |
| G06F 3/04886 | (2022.01) |

(52) U.S. Cl.
CPC ........ *G06F 3/04815* (2013.01); *G06F 3/0346* (2013.01); *G06F 3/04842* (2013.01); *G06F 3/04845* (2013.01); *G06F 3/04886* (2013.01)

(58) Field of Classification Search
None
See application file for complete search history.

(56) References Cited

U.S. PATENT DOCUMENTS

| 10,747,302 B2 * | 8/2020 | Steptoe ................ A63F 13/213 |
|---|---|---|
| 10,976,804 B1 | 4/2021 | Atlas et al. |
| 11,861,136 B1 * | 1/2024 | Faulkner ............ G06F 3/04886 |
| 2016/0140766 A1 * | 5/2016 | Balachandreswaran ..................... G06F 3/005 345/633 |
| 2018/0307397 A1 * | 10/2018 | Hastings ............... G06F 3/0484 |
| 2019/0012060 A1 | 1/2019 | Moore et al. |
| 2019/0034076 A1 * | 1/2019 | Vinayak ................ G06F 3/0346 |
| 2019/0339837 A1 * | 11/2019 | Furtwangler .......... G06F 3/014 |
| 2020/0193938 A1 * | 6/2020 | Estruch Tena ..... G02B 27/0172 |
| 2020/0201522 A1 | 6/2020 | Faulkner et al. |

(Continued)

OTHER PUBLICATIONS

International Search Report and Written Opinion for International Application No. PCT/US2023/031207, mailed Nov. 22, 2023, 12 pages.

(Continued)

*Primary Examiner* — Amare Mengistu
*Assistant Examiner* — Sarvesh J Nadkarni
(74) *Attorney, Agent, or Firm* — Potomac Law Group, PLLC; Dannon G. Allbee

(57) ABSTRACT

Many users access artificial reality (XR) experiences through their mobile phones. However, it is difficult to translate XR experiences to a two-dimensional (2D) screen in a way that feels intuitive and natural. Thus, the technology can map an interaction plane in a three-dimensional (3D) scene to the 2D screen with as many affordances as possible, even if the plane is not parallel to the mobile phone. The plane can be a fixed surface or a dynamically changeable surface through which the user sends inputs through the 2D screen. The mapping of the plane to the 2D screen can control interaction with a virtual object on the interaction plane in the XR environment, enabling parity between the same experience on XR and non-XR interfaces.

20 Claims, 11 Drawing Sheets

(56) References Cited

U.S. PATENT DOCUMENTS

| | | | |
|---|---|---|---|
| 2020/0228836 A1* | 7/2020 | Schwarz | G06T 17/10 |
| 2022/0080299 A1* | 3/2022 | Huang | A63F 13/2145 |
| 2022/0326967 A1* | 10/2022 | Khan | G06T 19/006 |

OTHER PUBLICATIONS

Rader M., et al., "MobiZone: Personalized Interaction with Multiple Items on Interactive Surfaces," Mobile and Ubiquitous Multimedia, Dec. 2, 2013, pp. 1-10.

* cited by examiner

TRANSLATING INTERACTIONS ON A TWO-DIMENSIONAL INTERFACE TO AN ARTIFICIAL REALITY EXPERIENCE

TECHNICAL FIELD

The present disclosure is directed to translating interactions on a two-dimensional (2D) interface to an artificial reality (XR) experience via a dynamic virtual plane.

BACKGROUND

Users interacting with artificial reality (XR) devices can view content in an artificial reality environment that includes real-world objects and/or two-dimensional (2D) and/or three-dimensional (3D) virtual objects. For example, the artificial reality environment can be a virtual environment depicted by a virtual reality (VR) device showing a set of virtual objects. As another example, the artificial reality environment can a mixed reality environment with real-world objects and virtual objects supplemented over the real-world objects. A user can view the objects in the artificial reality environment and modify content in the artificial reality environment.

Applications can exist that can operate on both XR interfaces and two-dimensional (2D) interfaces. A 2D interface can be a flat surface that can display 2D content, such as objects, graphics, text, etc. For example, a 2D interface can be part of a laptop computer, mobile device, television, etc. On the 2D interface, XR content can be rendered and interacted with differently than on an XR interface due to the limitations of a 2D interface as compared to a fully immersive XR experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
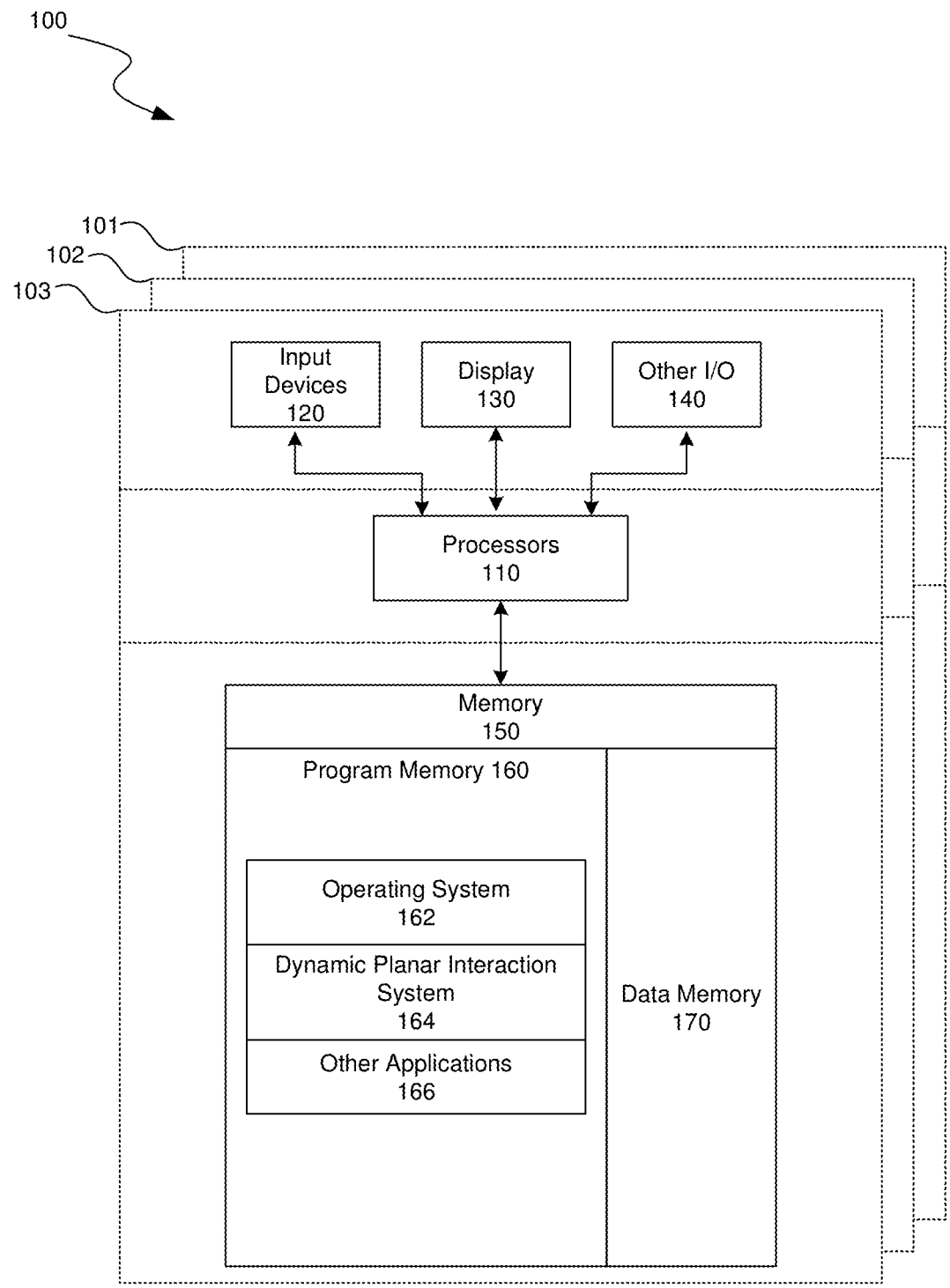
FIG. 1 is a block diagram illustrating an overview of devices on which some implementations of the present technology can operate.

Aspects of the present disclosure are directed to translating dynamic planar interactions on a two-dimensional (2D) interface to an artificial reality (XR) experience. Many users access XR experiences through a 2D interface, such as a mobile phone, tablet, or laptop computer. However, it is difficult to translate XR experiences to a 2D interface in a way that feels intuitive and natural. Thus, the disclosed technology can map an interaction plane, in a three-dimensional (3D) scene to the 2D interface, even though the interaction plane may not be parallel to the viewing window of the 2D interface. In some implementations, the interaction plane can be fixed to a surface in the XR experience, to which the user sends inputs through the 2D interface. However, in other implementations, the interaction plane can be dynamically changeable, such as through an on-screen joystick, through a mobile phone's gyroscopes, or through a time-based continual rotation of the plane. In some implementations, the mapping of the interaction plane to the 2D interface can control the extension of the avatar's hand into the interaction plane to interact with the XR environment. In some implementations, the mapping of the interaction plane to the 2D interface can allow a user to select and/or interact with virtual objects within the XR environment without moving her avatar. Thus, the technology can enable parity between the same experience on XR and non-XR interfaces.

For example, a user on a mobile phone can load an XR baseball experience in which the user's avatar can swing a virtual bat at a virtual ball projected into the XR environment. Some implementations can project an interaction plane intersecting the virtual ball at a predefined position and angle, e.g., parallel to the 2D surface with the virtual ball located in the center of the interaction plane. A user can use the gyroscopes of the mobile phone to change the angle of the interaction plane through which she wants her avatar to swing the virtual bat. When the interaction plane is at the desired angle, the user can tap the screen of the mobile device (e.g., tap the virtual ball) to swing the virtual bat along the interaction plane and hit the virtual ball.

In another example, a user on a laptop computer can load an XR construction experience in which the user's avatar can build a virtual house in the XR environment. Some implementations can project an interaction plane in the XR construction experience. The user can manipulate virtual joysticks to change the position of the interaction plane such that it intersects with a virtual nail. The user can further manipulate the virtual joysticks to change the angle of the interaction plane with respect to the virtual nail. For example, in order for the user's avatar to hammer the virtual nail, the interaction plane can be manipulated to be vertical. The user can then click the virtual nail to swing the hammer along the interaction plane and hit the virtual nail.

In still another example, a user on a tablet can load an XR outdoor experience in which the user's avatar can walk through virtual neighborhoods and parks. Some implementations can project an interaction plane in a virtual park to allow the user to make selections and/or interactions with virtual objects within the virtual park. For example, some implementations can project an interaction plane through input mechanisms (e.g., virtual buttons) corresponding to suggested actions, such as customizing the look of the virtual park or traveling to another virtual world.

As used herein, an "XR interface" can be a device capable of displaying a fully immersive XR experience, such as a head-mounted display within an XR system. In some implementations, the XR system can include devices and components other than the XR interface to support the XR experience, such as processing components, input/output devices (e.g., controllers), etc. Such components are described further herein with respect to FIGS. 2A-2C.

A "2D interface" can be an application or device that can render an XR environment on a 2D surface. For example, a 2D interface can be a computer screen, television display, mobile device (e.g., cellular phone), mobile application, web browser, etc. The 2D interface can be part of a 2D system including other devices and components, such as processing components, input/output devices, etc.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Implementations improve on existing technology for rendering XR experiences on 2D interfaces in that they emulate a 3D experience on a 2D interface. Some implementations can translate input on a 2D interface to the 6 degrees of freedom native to XR interfaces, without requiring that the input be translated parallel to the 2D interface. By modulating how user input is applied to an XR environment via an interaction plane, some implementations can reproduce fairly complex 3D behaviors on a 2D interface. The implementations described herein are necessarily rooted in computing technology, e.g., the rendering of and interaction with an XR experience on a 2D interface, and overcome a problem specifically arising from traditionally accessing XR experiences on 2D interfaces. For example, implementations can translate input received on the 2D interface to three dimensions to better mimic a fully 3D experience that would conventionally require an XR interface.

Several implementations are discussed below in more detail in reference to the figures. FIG. 1 is a block diagram illustrating an overview of devices on which some implementations of the disclosed technology can operate. The devices can comprise hardware components of a computing system 100 that can translate dynamic planar interactions on a two-dimensional interface to an artificial reality experience. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (H P Us), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, dynamic planar interaction system 164, and other application programs 166. Memory 150 can also include data memory 170 that can include, e.g., interaction plane rendering data, interaction plane manipulation data, virtual object rendering data, virtual object manipulation data, avatar rendering data, user interaction data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
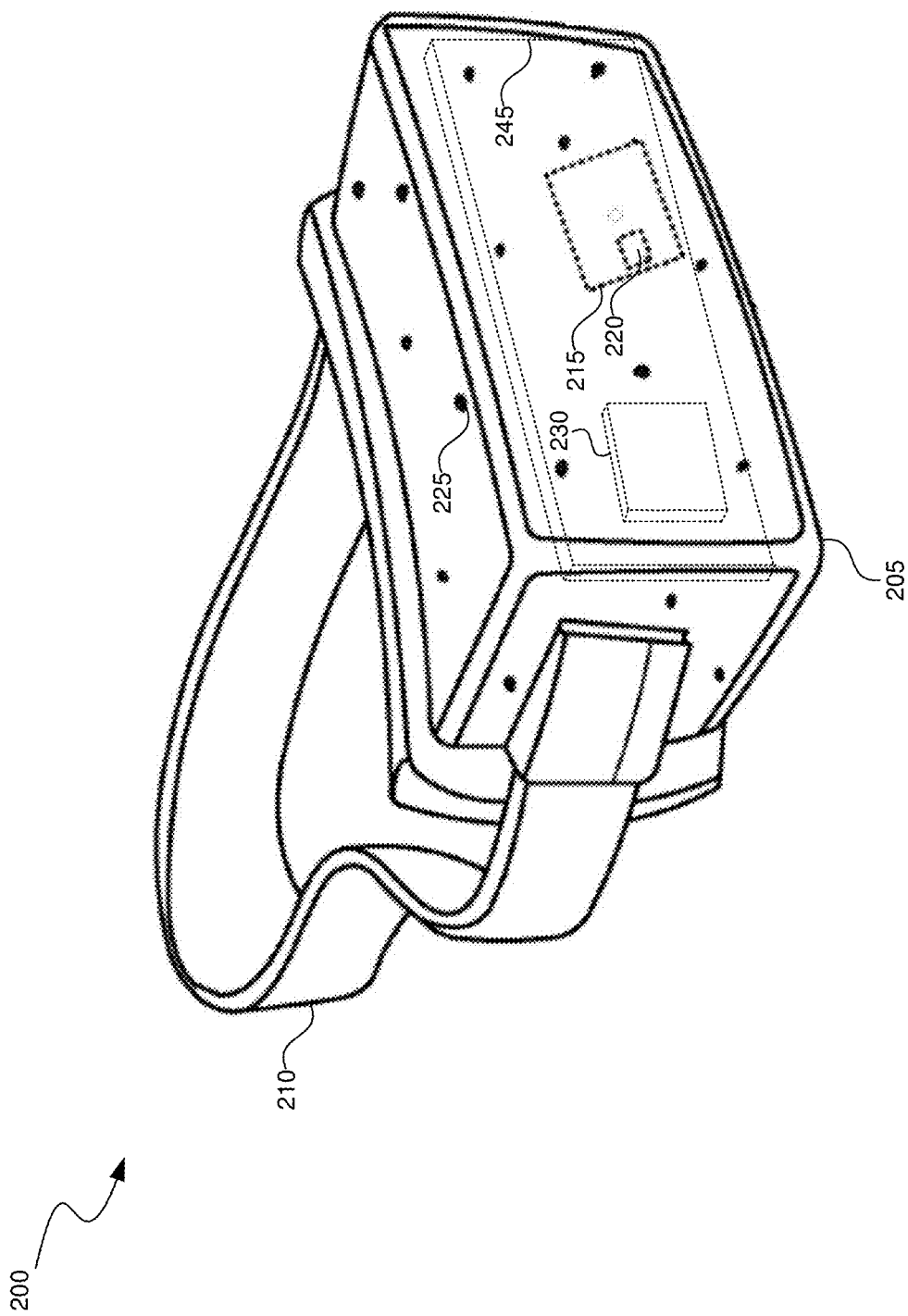
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
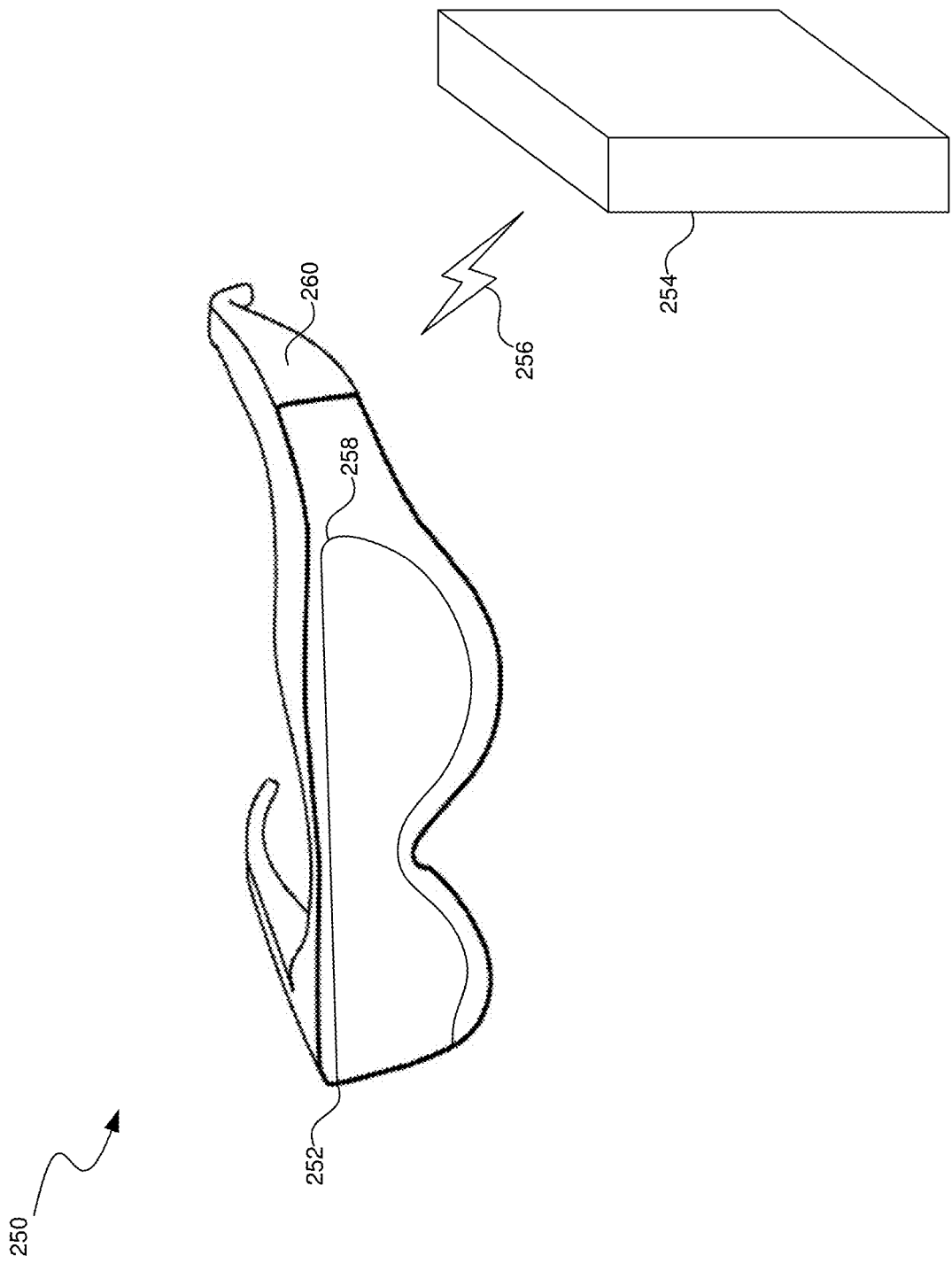
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
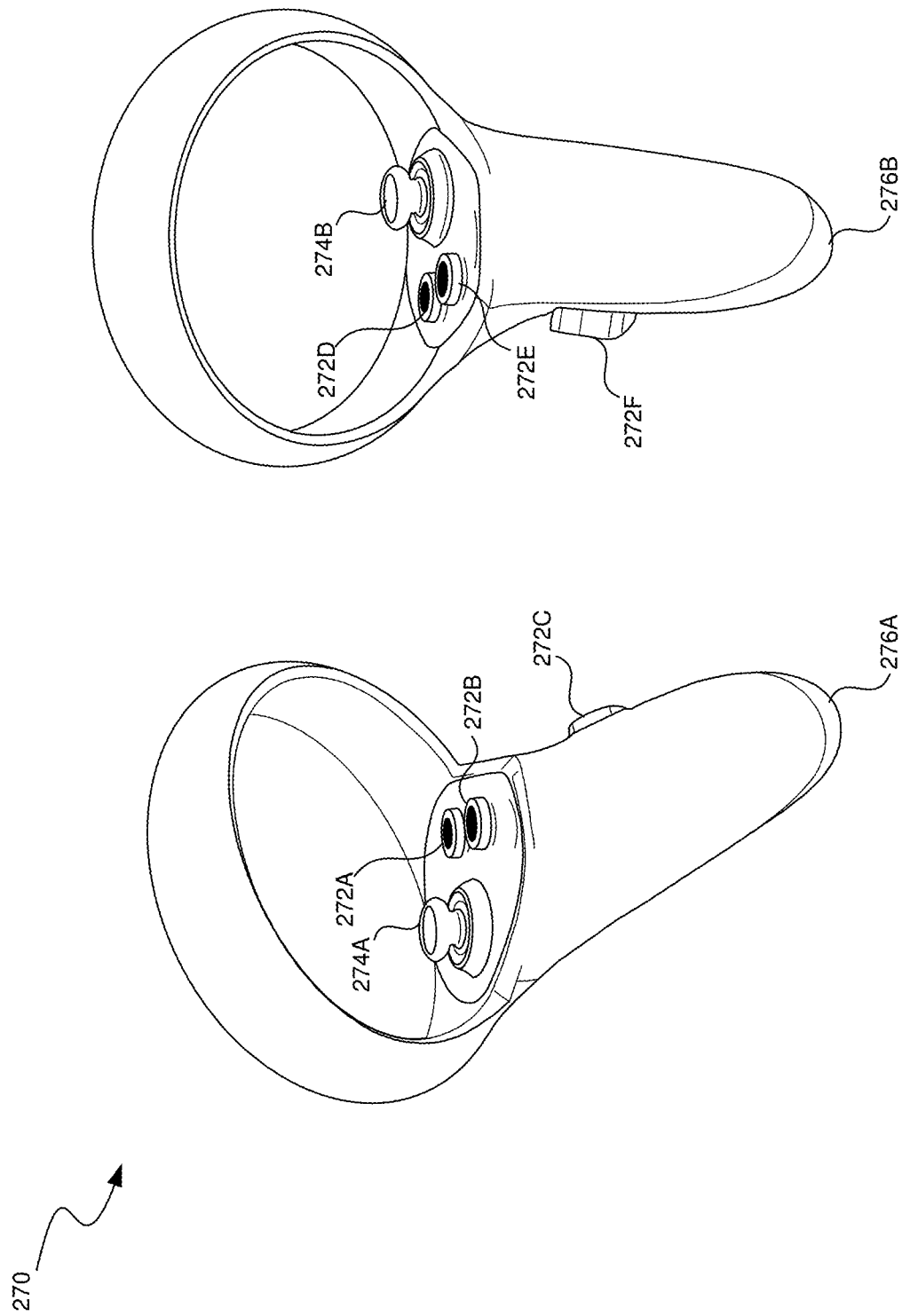
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
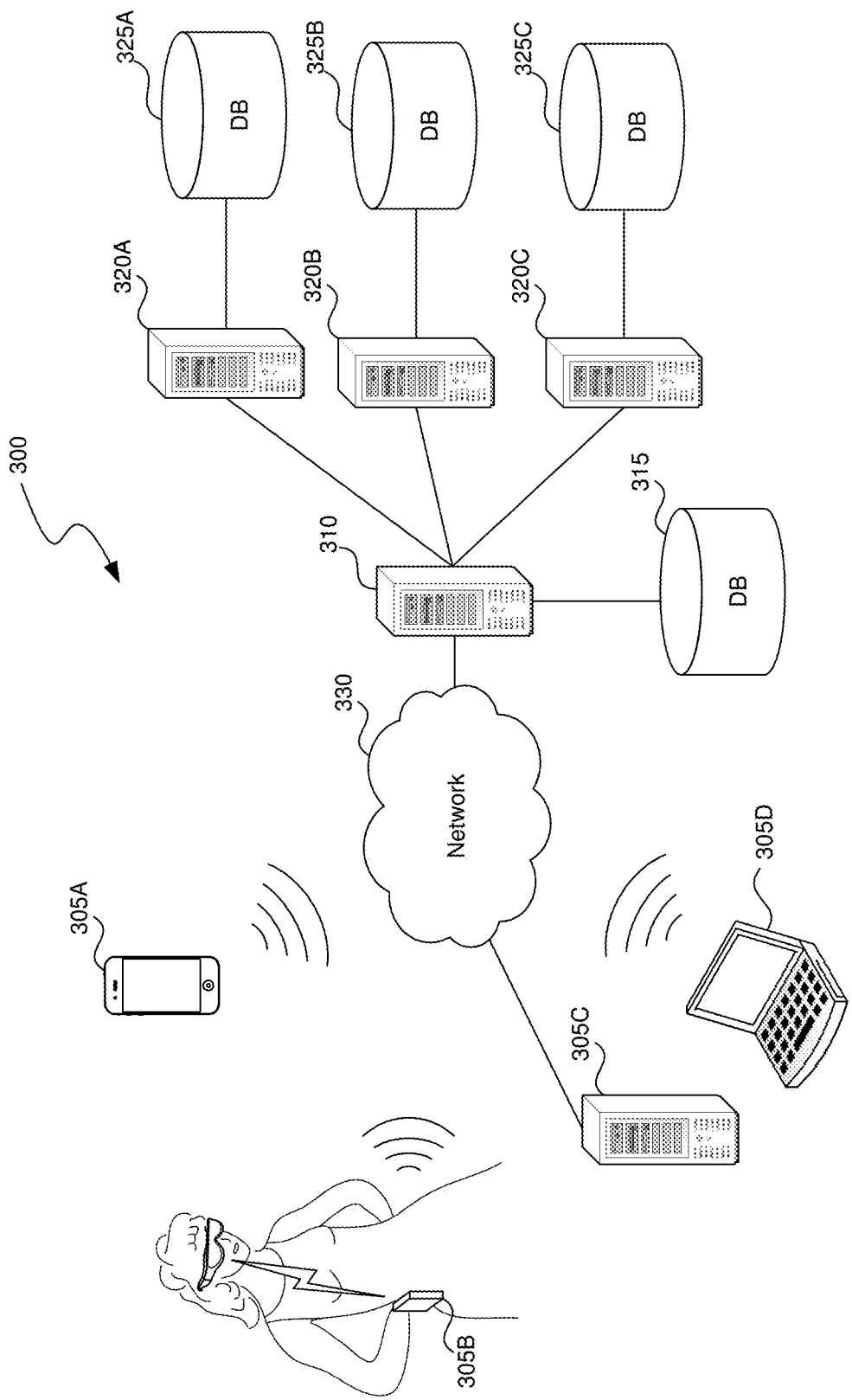
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
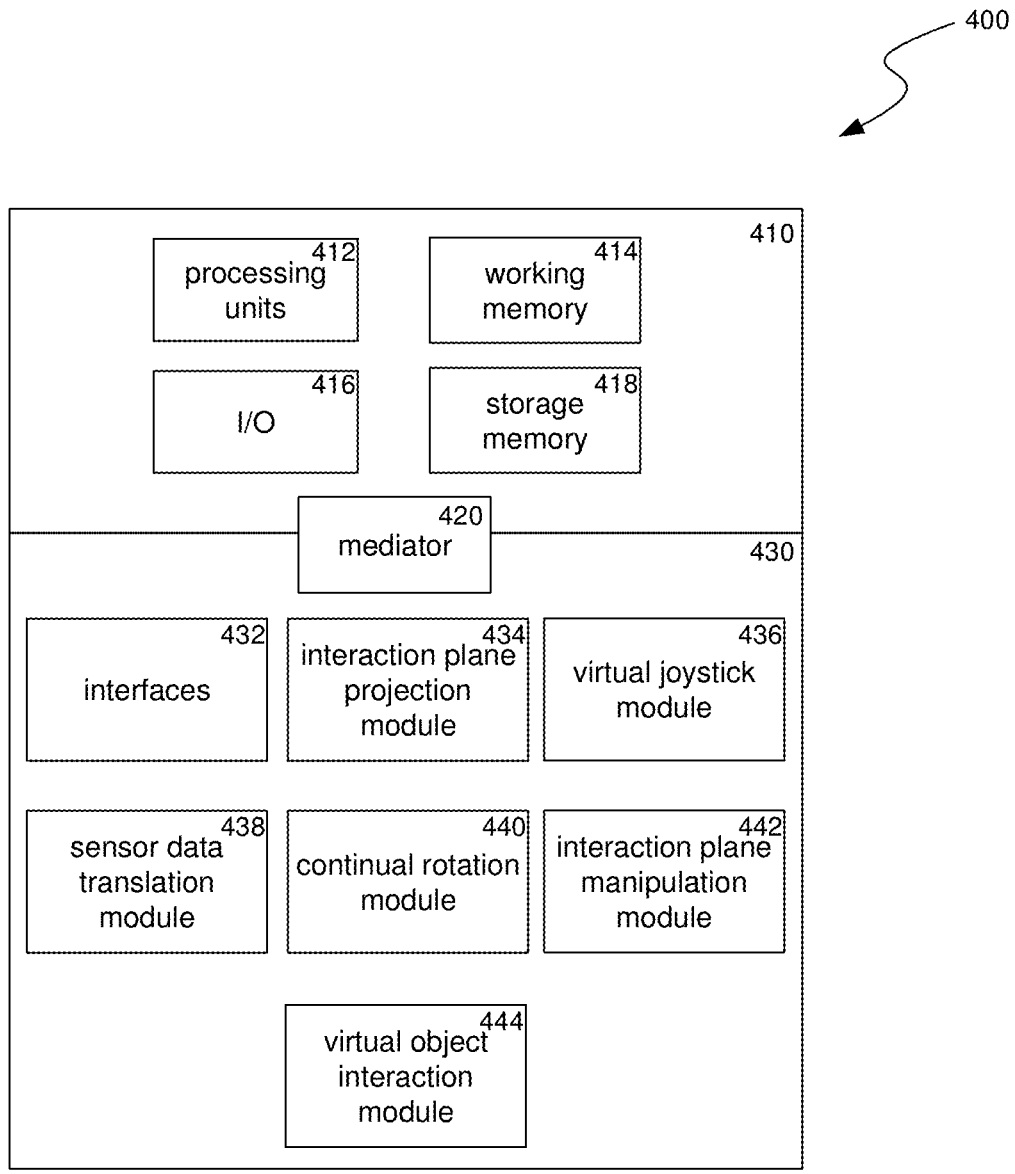
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for translating interactions on a two-dimensional (2D) interface to an artificial reality (XR) experience via a dynamic virtual plane. Specialized components 430 can include interaction plane projection module 434, virtual joystick module 436, sensor data translation module 438, continual rotation module 440, interaction plane manipulation module 442, virtual object interaction module 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications. Further, it is contemplated that one or more of specialized components 430 can be omitted in some implementations. For example, when one or more virtual joysticks are used to receive input, it is contemplated that sensor data translation module 438 and/or continual rotation module 440 can be omitted.

Interaction plane projection module 434 can project an interaction plane, in an XR experience, to a 2D interface. The interaction plane can be a virtual three-dimensional (3D) surface (e.g., a virtual shape or grid) through which a user can send inputs through the 2D interface. Interaction plane projection module 434 can project the interaction plane in the XR experience such that a user can select and/or interact with virtual objects intersecting that plane. Interaction plane projection module 434 can project the interaction plane at any angle (pitch, roll, and yaw) and position (x, y, z, axis) with respect to the 2D interface. Thus, some implementations can translate input on the 2D interface into 6 degrees of freedom that XR interfaces have natively, better emulating control of the XR experience from an XR interface.

Interaction plane projection module 434 can initially project the interaction plane at any point, location, and angle in the XR experience. For example, interaction plane projection module 434 can project the interaction plane at an arbitrary or default point and angle in the XR experience, such as the area in the XR experience positioned in the middle of the 2D interface with the interaction plane being parallel to the 2D interface. In another example, interaction plane projection module 434 can project the interaction plane at a predicted or suggested position and/or angle, such that the interaction plane can intersect one or more interactive virtual objects that can be seen by the user in the XR experience. Thus, in some implementations, a user can interact with virtual objects in the XR experience without further manipulation of the interaction plane, i.e., rendering interaction plane manipulation module 442 unnecessary. Further details regarding projecting an interaction plane in an XR experience to a 2D interface are described herein with respect to block 502 of FIG. 5.

Virtual joystick module 436 can receive an instruction to manipulate the interaction plane in the XR experience via user input to a virtual joystick. In some implementations, the virtual joystick can control the angle and/or position of the interaction plane in response to user selections (e.g., taps) and/or movements (e.g., swipes, gestures, etc.) made on a touchscreen of the 2D interface. In one example, the virtual joystick can include virtual left and right controllers displayed on the 2D interface that can respectively change the position of the interaction plane the angle of the interaction plane, such as is shown in FIGS. 6A and 6B. In another example, the virtual joystick can be controlled by the user performing particular motions on the 2D interface (e.g., a select and hold motion) in a particular area on the 2D interface, without virtual controllers being displayed. In still another example, the virtual joystick can be controlled through an I/O device (e.g., a mouse, keyboard, etc.) included in I/O devices 416. When virtual joystick module 436 is included in specialized components 430, it is contemplated that, in some implementations, sensor data translation module 438 and/or continual rotation module 440 can be omitted from specialized components 430. However, in some implementations, virtual joystick module 436, sensor data translation module 438, and continual rotation module 440 can all be included in specialized components 430. Further details regarding receiving an instruction to manipulate an interaction plane in an XR experience via a virtual joystick are described herein with respect to block 504 of FIG. 5.

Sensor data translation module 438 can receive an instruction to manipulate the interaction plane in response to data collected by one or more sensors of an inertial measurement unit (IMU) (e.g., a gyroscope, compass, accelerometer, etc.) in operable communication with or integral with the 2D interface (not shown). In some implementations, the IMU can be included in hardware 410. For example, the 2D interface can collect gyroscope data that sensor data translation module 438 can translate into an instruction to control the pitch, roll, and/or yaw of the interaction plane. When sensor data translation module 438 is included in specialized components 430, it is contemplated that, in some implementations, virtual joystick module 436 and/or continual rotation module 440 can be omitted from specialized components 430. However, in some implementations, virtual joystick module 436, sensor data translation module 438, and continual rotation module 440 can all be included in specialized components 430. Further details regarding receiving an instruction to manipulate an interaction plane in response to data collected by one or more sensors are described herein with respect to block 504 of FIG. 5.

Continual rotation module 440 can receive an instruction to manipulate the interaction plane automatically via execution of a script, e.g., as a response to detection of an interactive virtual object in the XR experience, and execute time-based continual rotation of the interaction plane. In some implementations, the interaction plane can temporally and constantly move such that it rotates through the field-of-view of the user of the 2D interface.

For example, interaction plane projection module 434 can project the interaction plane to intersect with a virtual object. Continual rotation module 440 can continually rotate and/or move the interaction plane about and through the virtual object through various angles and/or positions until a desired position of the interaction plane is reached. Then, in some implementations, through user input, continual rotation module 440 can pause the interaction plane at that point. However, in some implementations, continual rotation module 440 can continually rotate and/or move the interaction plane without accepting user input to pause its motion. In such implementations, a user of the 2D interface can wait until the interaction plane intersects with a virtual object and/or is at the desired angle with respect to the virtual object, then time his actions in accordance with the timing of the intersection. When continual rotation module 440 is included in specialized components 430, it is contemplated that, in some implementations, virtual joystick module 436 and/or sensor data translation module 438 can be omitted from specialized components 430. However, in some implementations, virtual joystick module 436, sensor data translation module 438, and continual rotation module 440 can all be included in specialized components 430. Further details regarding manipulating the interaction plane by executing a script applying time-based continual rotation of the interaction plane are described herein with respect to block 504 of FIG. 5.

Interaction plane manipulation module 442 can manipulate the interaction plane in the XR experience in response to the instruction(s) received by virtual joystick module 436, sensor data translation module 438, and/or continual rotation module 440. Interaction plane manipulation module 442 can manipulate the interaction plane by moving the interaction plane to a different location in the XR experience and/or by adjusting the angle of the interaction plane (e.g., by applying at least one of yaw, roll, pitch, or scaling, or any combination thereof) in accordance with the received instruction(s).

In some implementations, interaction plane manipulation module 442 can deform or change a shape of the interaction plane. For example, a user can change a default shape (e.g., a circle) of the interaction plane to a different shape (e.g., a rectangle, triangle, etc.). In another example, interaction plane manipulation module 442 can change the shape of the interaction plane based on a shape of a surface on which the interaction plane is projected, e.g., changing a circular interaction plane to instead be square based on a square table onto which the interaction plane is projected. In some implementations, a user can change the interaction plane to be three-dimensional (3D), to have texture, and/or to be nonplanar. Although described herein as being manipulatable, it is contemplated that in some implementations, the interaction plane can be a fixed surface to which a user can send inputs through the 2D interface. Further details regarding manipulation of the interaction plane in the XR experience are described herein with respect to block 506 of FIG. 5.

Virtual object interaction module 444 can receive, via the 2D interface and I/O devices 416, a request to interact with a virtual object in the XR experience along the interaction plane. The interaction can be a movement of the virtual object, a movement of an avatar with respect to the virtual object, a selection of the virtual object, etc. In some implementations, the virtual object can be a selectable and/or controllable element, e.g., a notification, a button, a text box, a graphic, etc. For example, the virtual object can be a text box with a suggested action. When the text box is selected through the interaction plane, virtual object interaction module 444 can execute the suggested action, e.g., travel to a different virtual world, interact with another virtual object, etc.

In some implementations, the interaction plane can define a position and/or angle of movement of a hand of an avatar associated with the user of the 2D interface. In other words, the mapping of the interaction plane to the 2D interface can control the extension of the avatar's hand into the interaction plane to interact with the virtual object in the XR environment. Further details regarding receiving a request to interact with a virtual object along an interaction plane are described herein with respect to block 508 of FIG. 5.

In response to the request, virtual object interaction module 444 can interact with the virtual object along the interaction plane in the XR experience. For example, virtual object interaction module 444 can move a virtual object intersecting with the interaction plane to another location on the interaction plane, e.g., in response to a user tapping and dragging the virtual object along the interaction plane. In another example, virtual object interaction module 444 can move a virtual object intersecting with the interaction plane to a location outside of the interaction plane in the XR experience. For example, a user can use the projected interaction plane to select a virtual object (potentially from a plurality of virtual objects) intersecting with the interaction plane, then tap a location outside of the interaction plane to move the virtual object to that position. In still another example, virtual object interaction module 444 can select a controllable element intersecting with the interaction plane, e.g., a button, text box, graphic, etc., that can cause an action to be taken within the XR experience. Further details regarding interacting with a virtual object along an interaction plane are described herein with respect to block 510 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
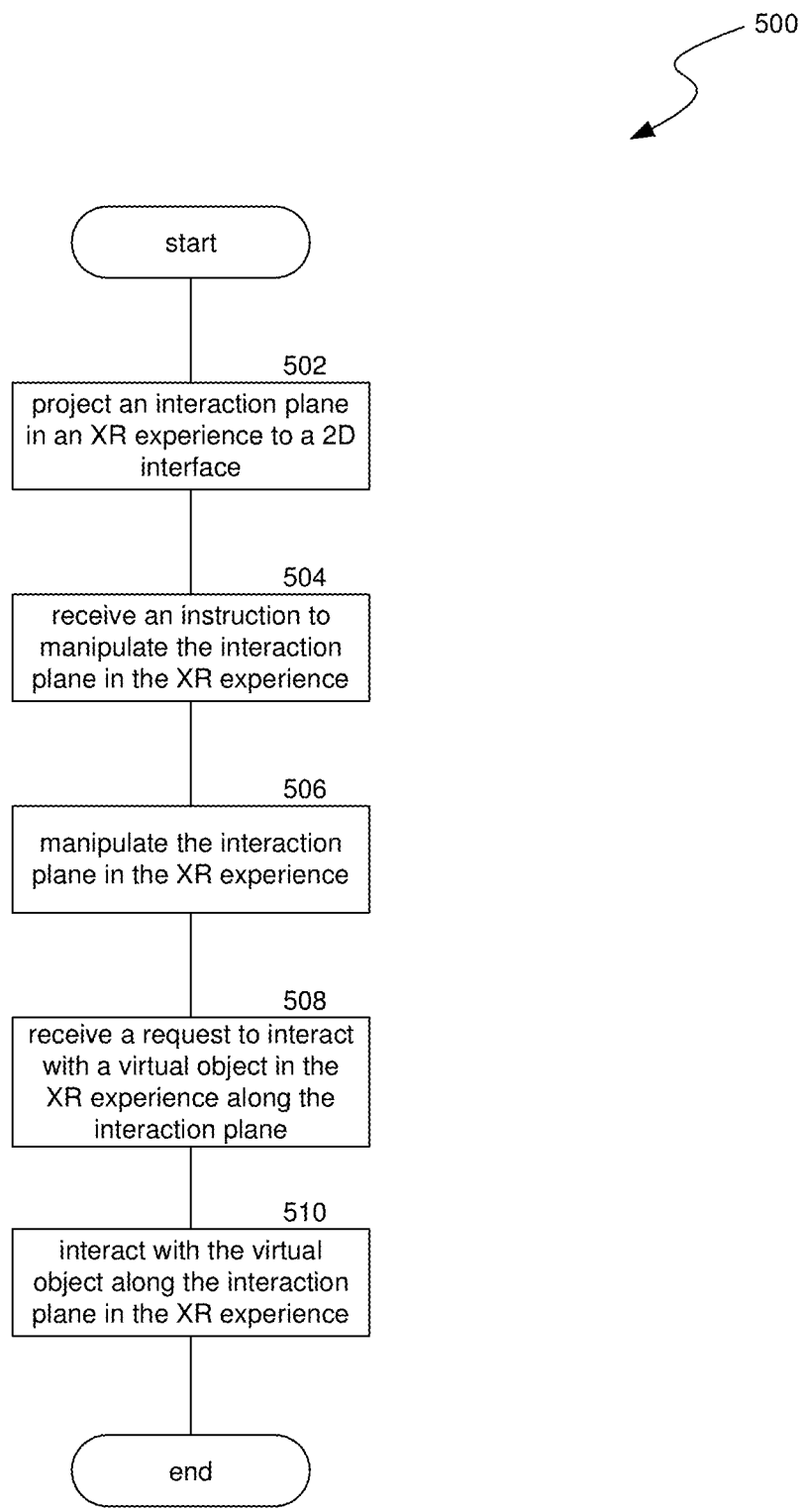
FIG. 5 is a flow diagram illustrating a process used in some implementations of the present technology for translating dynamic planar interactions on a two-dimensional interface to an artificial reality experience.
Figure 6A:
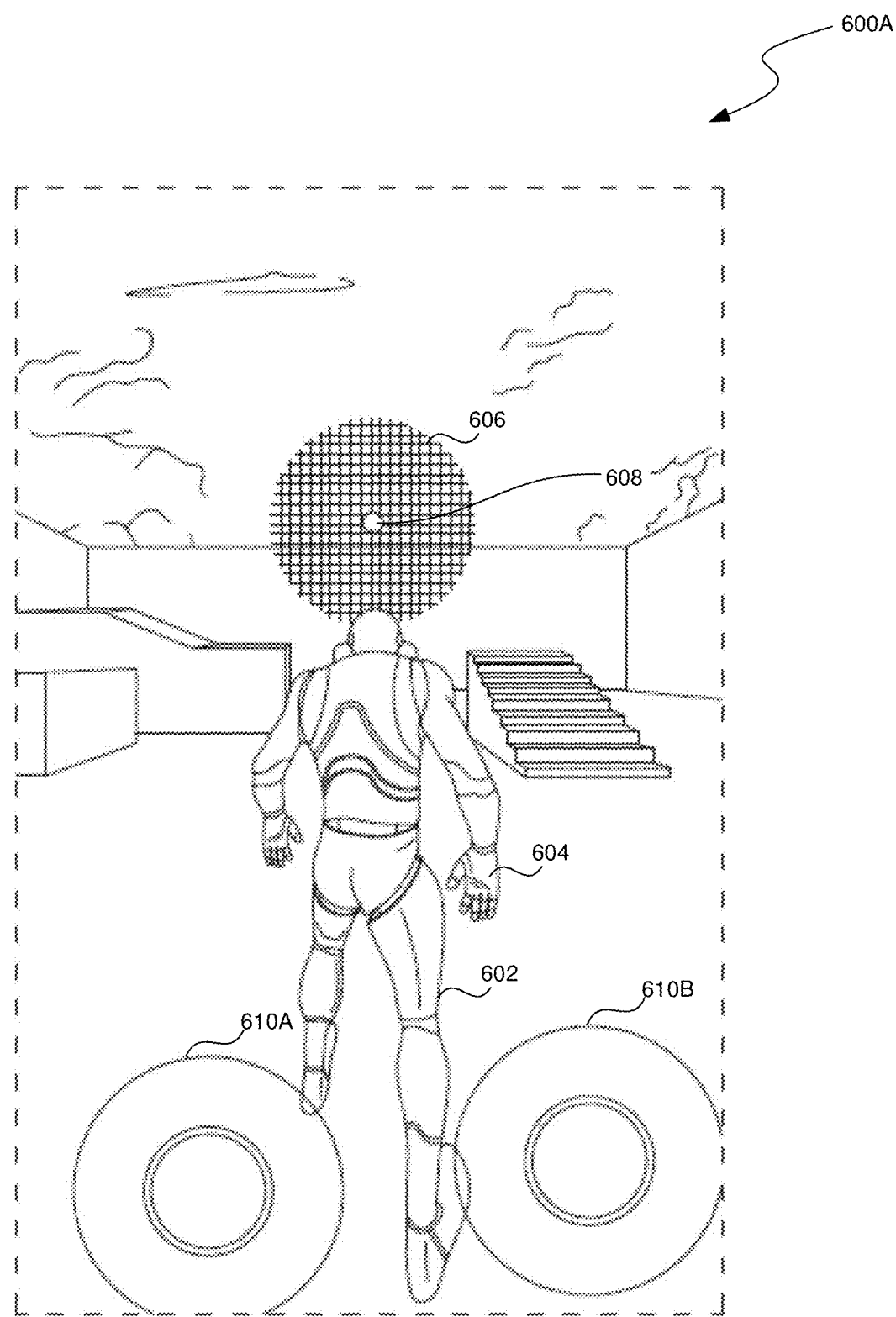
FIG. 6A is a conceptual diagram illustrating an example artificial reality experience having a projected interaction plane intersecting a virtual object for interaction by a hand of an avatar.
Figure 6B:
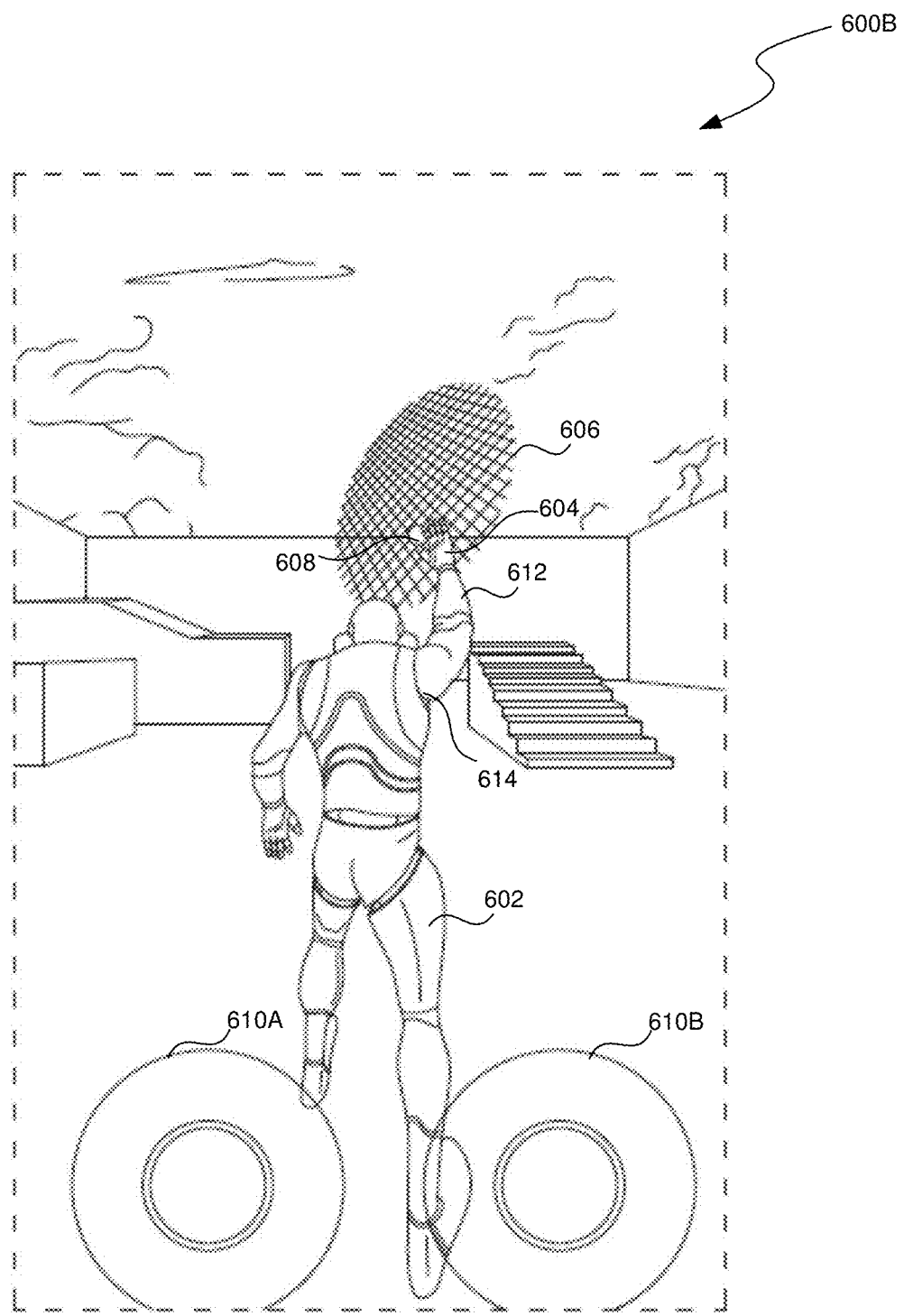
FIG. 6B is a conceptual diagram illustrating an example artificial reality experience having a manipulated interaction plane intersecting a virtual object with a hand of an avatar extending along the interaction plane to grasp the virtual object.

FIG. 5 is a flow diagram illustrating a process 500 used in some implementations for translating dynamic planar interactions on a two-dimensional (2D) interface to an artificial reality (XR) experience. In some implementations, process 500 can be performed as a response to a user request to project an interaction plane in an XR experience to a 2D interface. In some implementations, process 500 can be performed automatically upon display of an interactive element, such as a virtual object (e.g., a virtual ball, a virtual game piece, a virtual button, a notification, a virtual menu, etc.). In some implementations, process 500 can be performed by the 2D interface. In some implementations, process 500 can be performed by a server supporting such a 2D interface. In some implementations, some blocks of process 500 can be performed locally by the 2D interface, while other blocks of process 500 can be performed remotely by a server.

At block 502, process 500 can project an interaction plane, in the XR experience, to the 2D interface. The interaction plane can be a virtual surface through which a user can send inputs through the 2D interface. For example, process 500 can project the interaction plane in the XR experience such that a user can interact with virtual objects intersecting that plane. In some implementations, the interaction plane does not have to be parallel to the 2D interface. For example, the interaction plane can be projected partially perpendicular to the 2D interface and/or at any angle (pitch, roll, and yaw) and position (x, y, z, axis) with respect to the 2D interface.

In some implementations, process 500 can project the interaction plane at an arbitrary point in the XR experience, such as the area in the XR experience positioned in the middle of the 2D interface. In some implementations, process 500 can project the interaction plane at a particular point in the XR experience. For example, process 500 can project the interaction plane at a position and/or angle intersecting one or more virtual objects in a user's field-of-view in the XR experience. In another example, process 500 can project the interaction plane at a position and/or angle corresponding to predicted movement of an avatar of the user within the XR experience, such as at a point, range, and/or angle within virtual reach of the avatar's arm.

At block 504, process 500 can receive an instruction to manipulate the interaction plane in the XR experience. In some implementations, process 500 can receive the instruction to manipulate the interaction plane from user input. For example, in some implementations, user input via a virtual joystick displayed on the 2D interface can generate the instruction to manipulate the interaction plane. The virtual joystick can control the angle and position of the interaction plane. For example, the virtual joystick can include virtual left and right controllers, one of which can change the position of the interaction plane, and the other of which can change the angle of the interaction plane, as described further herein with respect to FIG. 6B.

In another example, the instruction to manipulate the interaction plane can be generated in response to data collected by a gyroscope and/or other sensors of an inertial measurement unit (IMU) in operable communication with the 2D interface. For example, when the 2D interface is a mobile phone, the mobile phone can include one or more sensors of an IMU that can be used to detect movement of the mobile phone. Process 500 can translate the movements of the mobile phone into instruction(s) to manipulate the interaction plane. For example, motion data associated with movement of the 2D interface can be captured by one or more sensors, such as an accelerometer, a gyroscope, a GPS, and/or a magnetometer. The measurements may include the non-gravitational acceleration of the device in the x, y, and z directions; the gravitational acceleration of the device in the x, y, and z directions; the yaw, roll, and pitch of the device; the derivatives of these measurements; the gravity difference angle of the device; and the difference in normed gravitational acceleration of the device.

In some implementations, process 500 can receive the instruction to manipulate the interaction plane automatically from a script, e.g., as a response to detection of an interactive virtual object in the XR experience. For example, a script executing time-based continual rotation of the interaction plane can generate the instruction to manipulate the interaction plane. In some implementations, the interaction plane can temporally and constantly move such that it rotates through the field-of-view of the user of the 2D interface. In some implementations, through user input, process 500 can pause the interaction plane at a certain angle. In some implementations, a user can wait until the interaction plane intersects with a virtual object, then time his actions in accordance with the timing of the intersection. Although described herein as being manipulatable, it is contemplated that in some implementations, the interaction plane can be a fixed surface to which a user can send inputs through the 2D interface.

At block 506, in response to the instruction, process 500 can manipulate the interaction plane in the XR experience. In some implementations, process 500 can manipulate the interaction plane by moving the interaction plane to a different location in the XR experience, e.g., based on user input received from a virtual joystick or movement detected by a sensor of an IMU. In some implementations, process 500 can manipulate the interaction plane in the XR experience by applying at least one of yaw, roll, pitch, or scaling, or any combination thereof, to the interaction plane. For example, through the received instruction(s) to manipulate the interaction plane, process 500 can rotate the interaction plane around the vertical axis (i.e., yaw), around the side-to-side axis (i.e., pitch), and/or around the front-to-back axis (i.e., roll). Additionally or alternatively, process 500 can scale the interaction plane such that it becomes bigger or smaller within the XR experience. In some implementations, a shape of the interaction plane can be deformable in response to a user command. For example, a user can change a default shape (e.g., a circle) of the interaction plane to a different shape (e.g., a rectangle, triangle, etc.). In some implementations, a user can change the interaction plane to be three-dimensional (3D).

At block 508, process 500 can receive, via the 2D interface, a request to interact with a virtual object in the XR experience along the interaction plane. In some implementations, the interaction can be a selection and/or movement of a virtual object along the interaction plane. For example, process 500 can manipulate the interaction plane to intersect with a virtual object. Based on user input, process 500 can select and/or move the virtual object along the manipulated interaction plane. The user input can be, for example, a selection of an area on the interaction plane (e.g., a tap or click), a dragging motion of the object along the interaction plane, etc.

In some implementations, a hand of an avatar associated with the user of the 2D interface can be moved along the interaction plane to interact with the virtual object intersecting with the interaction plane. In such implementations, the interaction plane can define the angle of rotation of an arm of the avatar from the shoulder joint. The mapping of the interaction plane to the 2D interface can control the extension of the avatar's hand into the interaction plane to interact with the virtual object in the XR experience. In some implementations, the virtual object can be another interactive element, such as a notification, a button or other controllable element, etc.

At block 510, in response to the request, process 500 can interact with the virtual object along the interaction plane in the XR experience. For example, process 500 can move a virtual object intersecting with the interaction plane to the location in the XR experience corresponding to where a tap or click was made via the 2D interface. In another example, process 500 can receive a tap or click of a virtual object intersecting with the interaction plane, followed by a dragging motion along the interaction plane. In such an example, process 500 can move the virtual object to the location in the XR experience where the dragging motion ends within the interaction plane, via the 2D interface. In still another example, process 500 can select a virtual object (e.g., a controllable and/or selectable element) in order to perform a particular action on that virtual object (e.g., changing a color of a virtual car intersecting with the interaction plane) or specified by that virtual object (e.g., traveling to a different world suggested by a text box intersecting with the interaction plane).

FIG. 6A is a conceptual diagram illustrating an example XR experience 600A having a projected interaction plane 606 intersecting a virtual object 608 for interaction by a hand 604 of an avatar 602, as displayed on a 2D interface. In this example, virtual object 608 is a virtual ball. Some implementations can project interaction plane 606 in XR experience 600A in response to a user request to display interaction plane 606, while some implementations can automatically project interaction plane 606 in XR experience 600A in response to detection of a virtual object 608 with which avatar 602 can interact. In FIG. 6A, interaction plane 606 is initially projected parallel to the 2D interface. Thus, a user manipulating hand 604 of avatar 602 would move hand 604 vertically along interaction plane 606 in its initial position and angle.

XR experience 600A further includes virtual joysticks 610A, 610B. Virtual joysticks 610A, 610B can be manipulated by a user of the 2D interface to change the position and/or angle of interaction plane 606. For example, manipulation of joystick 610A can control the position of interaction plane 606, while manipulation of joystick 610B can control the angle of interaction plane 606.

FIG. 6B is a conceptual diagram illustrating an example XR experience 600B having a manipulated interaction plane 606 intersecting a virtual object 608 with a hand 604 of an avatar 602 extending along the interaction plane 606 to grasp the virtual object 608. Some implementations can receive an instruction to manipulate interaction plane 606 in XR experience 600B via virtual joysticks 610A, 610B. For example, as compared to XR experience 600A, a user can manipulate virtual joysticks 610A, 610B to change the position and angle of interaction plane 606 in XR experience 600B, such that interaction plane 606 is angled at about 45 degrees and extending away from avatar 602, while still intersecting virtual object 608.

Some implementations can receive, via the 2D interface, a request to move hand 604 in XR experience 600B along manipulated interaction plane 606. In FIG. 6B, interaction plane 606 can define the angle of rotation of arm 612 of avatar 602 from the shoulder 614. The mapping of interaction plane 606 to the 2D interface can control the extension of the avatar 602's hand 604 into interaction plane 606 to interact with virtual object 608, i.e., to grasp the ball.

Figure 7:
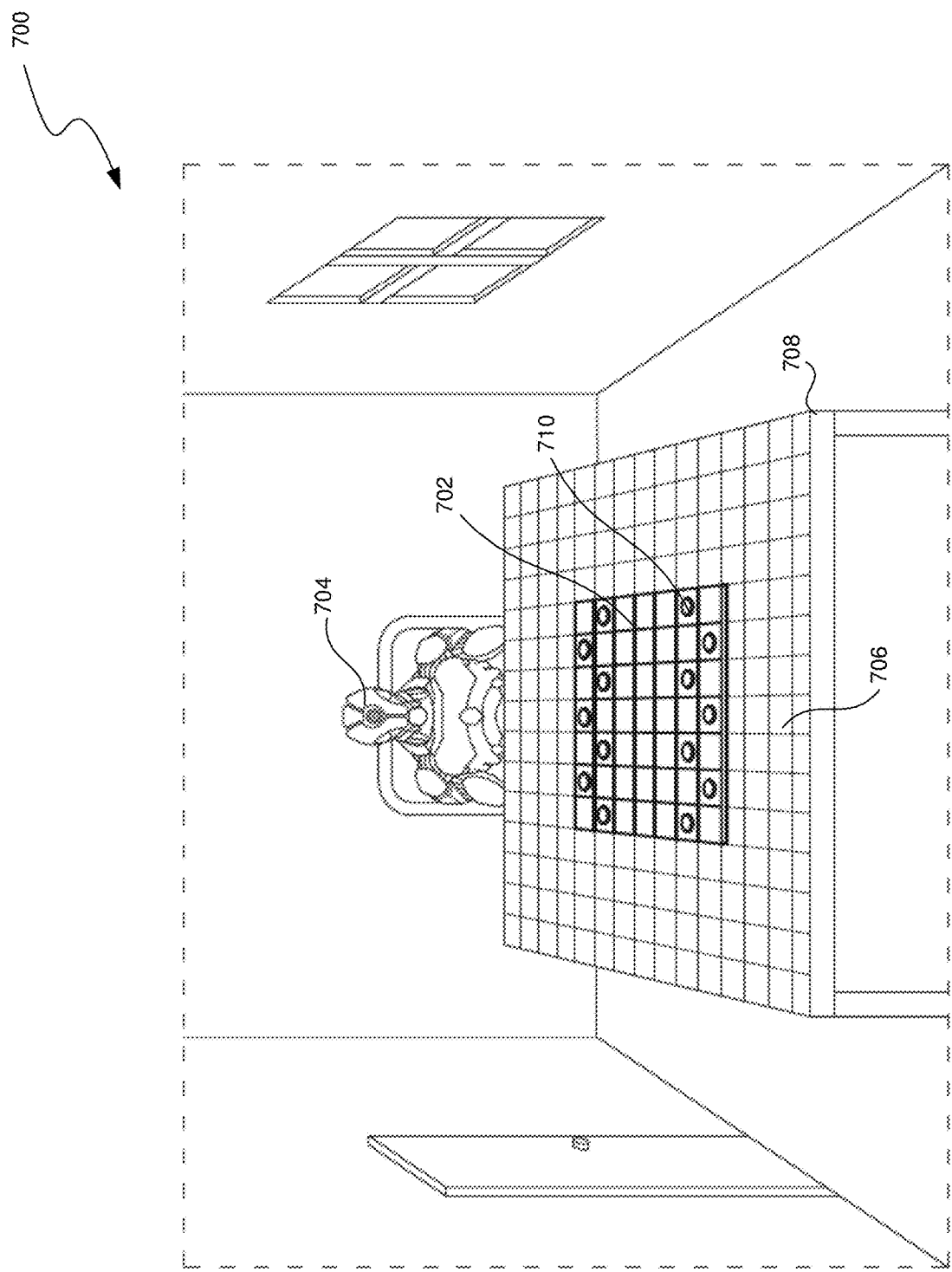
FIG. 7 is a conceptual diagram illustrating an example artificial reality experience having an interaction plane projected onto a fixed surface.

FIG. 7 is a conceptual diagram illustrating an example XR experience 700 having an interaction plane 706 projected onto a fixed surface 708. In FIG. 7, a first user's avatar (not shown) is engaging in the XR experience 700 (in this example, virtual checkers game 702) with a second user's avatar 704 from a 2D interface. Some implementations can project interaction plane 706 onto fixed surface 708 (in this example, a tabletop), such that the first user's avatar (not shown) and the second user's avatar 704 can move virtual checkers pieces 710 along interaction plane 706 to play virtual checkers game 702.

Some implementations can project interaction plane 706 in XR experience 700 in response to a user request to display interaction plane 706. Some implementations can automatically project interaction plane 706 in XR experience 700 in response to detection of fixed surface 708 and/or virtual checkers pieces 710 with which the first user's avatar (not shown) and the second user's avatar 704 can interact. Some implementations can manipulate the shape of interaction plane 708 to match the shape of fixed surface 708, such that virtual objects (e.g., virtual checkers pieces 710) intersecting with interaction plane 706 can be selected, moved, or otherwise interacted with along interaction plane 706 projected onto fixed surface 708.

Figure 8:
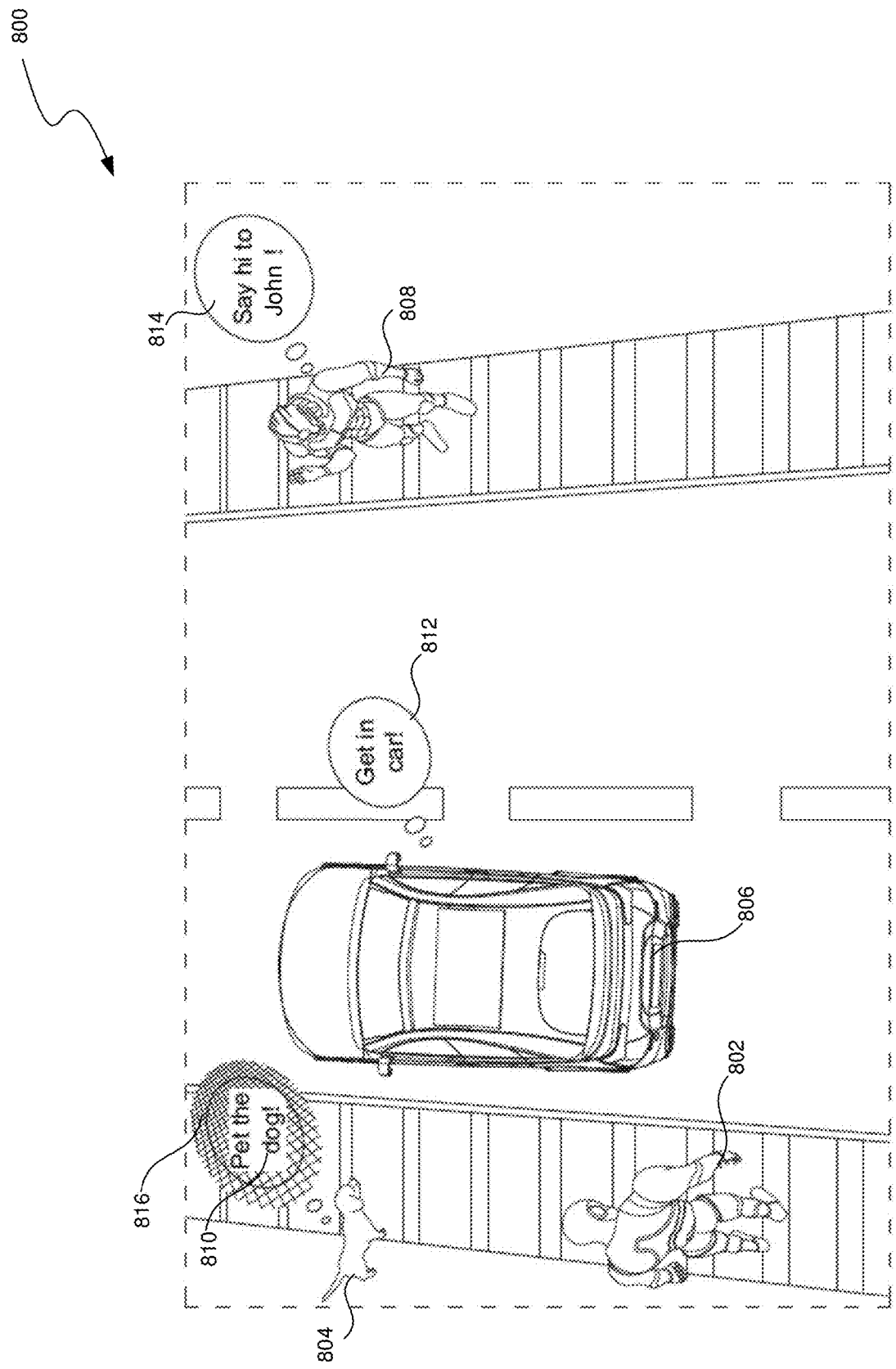
FIG. 8 is a conceptual diagram illustrating an example artificial reality experience having an interaction plane projected onto a virtual object for interaction.

FIG. 8 is a conceptual diagram illustrating an example XR experience 800 having an interaction plane 816 projected onto a virtual object 810 for interaction. In FIG. 8, XR experience 800 is a virtual neighborhood experience in which an avatar 802 of a first user on a 2D interface can explore the virtual neighborhood and interact with virtual objects and other avatars in the virtual neighborhood. The virtual objects can include, for example, virtual dog 804, virtual car 806, and avatar 808 of a second user, as well as selectable elements 810, 812, and 814.

In XR experience 800, selectable elements 810, 812, and 814 can be selected by the first user associated with avatar 802 without avatar 802 having to touch selectable elements 810, 812, and 814. For example, some implementations can project interaction plane 816 such that it is intersecting with selectable element 810, and/or the first user associated with avatar 802 can manipulate interaction plane 816 such that it is intersecting with selectable element 810. The first user associated with avatar 802 can then tap or click the 2D interface in the location corresponding to selectable element 810, for example, in order to select selectable element 810. In this example, selectable elements 810-814 can be selected to perform actions respectively specified by selectable elements 810-814. For example, in response to the selection of selectable element 810 via interaction plane 816, avatar 802 associated with the first user can move to pet virtual dog 804.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for translating dynamic planar interactions on a two-dimensional interface to an artificial reality experience, the method comprising:
   rendering, by a display of the two-dimensional interface, a virtual object in the artificial reality environment;
   projecting an interaction plane, in the artificial reality experience, to the display of the two-dimensional interface, the interaction plane being a virtual surface through which a user can send inputs through the two-dimensional interface, mapped to the interaction plane, into the artificial reality experience;
   receiving an instruction, detected by the two-dimensional interface, to manipulate the interaction plane in the artificial reality experience;
   in response to the instruction, manipulating the interaction plane in the artificial reality experience by applying at least one of yaw, roll, pitch, or scaling, or any combination thereof, to the interaction plane, thereby causing the interaction plane to intersect with the virtual object in the artificial reality experience, as displayed on the display of the two-dimensional interface;
   receiving, via the two-dimensional interface, a request to interact with the virtual object, at a point of intersection of the virtual object with the interaction plane in the artificial reality experience, via the mapping of the two-dimensional interface to the interaction plane; and
   in response to the request, causing an interaction with the virtual object, in relation to the interaction plane, at the point of intersection of the virtual object with the interaction plane.

2. The method of claim 1, wherein the instruction is generated by a virtual joystick displayed on the display of the two-dimensional interface.

3. The method of claim 1, wherein the instruction is generated in response to data collected by a gyroscope in operable communication with the two-dimensional interface.

4. The method of claim 1, wherein the instruction is generated by a script executing time-based continual rotation of the interaction plane.

5. The method of claim 1, wherein the interaction plane is not parallel to the display of the two-dimensional interface.

6. The method of claim 1, wherein the interaction with the virtual object includes moving the virtual object, via a hand of an avatar associated with the user, from the point of intersection along the interaction plane.

7. The method of claim 1, wherein the interaction with the virtual object includes selecting the virtual object, and wherein the method further comprises:
   in response to selecting the virtual object, performing a second action pre-defined for the virtual object.

8. The method of claim 1, wherein a shape of the interaction plane is deformable in response to a user command.

9. A computer-readable storage medium storing instructions that, when executed by a computing system, cause the computing system to perform a process for translating dynamic planar interactions on a two-dimensional interface to an artificial reality experience, the process comprising:
   rendering, by a display of the two-dimensional interface, a virtual object in the artificial reality experience;
   projecting an interaction plane, in the artificial reality experience, to the display of the two-dimensional interface, the interaction plane being a virtual surface through which a user can send inputs through the two-dimensional interface, mapped to the interaction plane, into the artificial reality experience;
   receiving a command, detected by the two-dimensional interface, to manipulate the interaction plane in the artificial reality experience;
   in response to the command, manipulating the interaction plane in the artificial reality experience, thereby causing the interaction plane to intersect with the virtual object in the artificial reality experience, as displayed on the display of the two-dimensional interface;
   receiving, via the two-dimensional interface, a request to interact with the virtual object, at a point of intersection with the interaction plane in the artificial reality experience, via the mapping of the two-dimensional interface to the interaction plane; and
   in response to the request, causing an interaction with the virtual object in relation to the interaction plane, at the point of intersection of the virtual object with the interaction plane.

10. The computer-readable storage medium of claim 9, wherein the interaction plane is manipulated in the artificial reality experience by applying at least one of yaw, roll, pitch, or scaling, or any combination thereof, to the interaction plane.

11. The computer-readable storage medium of claim 9, wherein the command is generated by a virtual joystick displayed on the display of the two-dimensional interface.

12. The computer-readable storage medium of claim 9, wherein the command is generated in response to data collected by a gyroscope in operable communication with the two-dimensional interface.

13. The computer-readable storage medium of claim 9, wherein the command is generated by a script executing time-based continual rotation of the interaction plane.

14. The computer-readable storage medium of claim 9, wherein the interaction plane is not parallel to the display of the two-dimensional interface.

15. The computer-readable storage medium of claim 9, wherein the interaction with the virtual object includes moving the virtual object, via a hand of an avatar associated with the user, from the point of intersection along the interaction plane.

16. A computing system for translating dynamic planar interactions on a two-dimensional interface to an artificial reality experience, the computing system comprising:
   one or more processors; and
   one or more memories storing instructions that, when executed by the one or more processors, cause the computing system to perform a process comprising:
      rendering, by a display of the two-dimensional interface, a virtual object in the artificial reality experience;
      projecting an interaction plane, in the artificial reality experience, to the display of the two-dimensional interface, the interaction plane being a virtual surface through which a user can send inputs through the two-dimensional interface, mapped to the interaction plane, into the artificial reality experience;

receiving a command, detected by the two-dimensional interface, to manipulate the interaction plane in the artificial reality experience;

in response to the command, manipulating the interaction plane in the artificial reality experience, thereby causing the interaction plane to intersect with the virtual object in the artificial reality experience, as displayed on the display of the two-dimensional interface;

receiving, via the two-dimensional interface, a request to interact with the virtual object, at a point of intersection with the interaction plane in the artificial reality experience, via the mapping of the two-dimensional interface to the interaction plane; and in response to the request, causing an interaction with the virtual object in relation to the interaction plane, at the point of intersection of the virtual object with the interaction plane.

17. The computing system of claim 16, wherein the interaction plane is manipulated in the artificial reality experience by applying at least one of yaw, roll, pitch, or scaling, or any combination thereof, to the interaction plane.

18. The computing system of claim 16, wherein the command is generated by a virtual joystick displayed on the display of the two-dimensional interface.

19. The computing system of claim 16, wherein the command is generated in response to data collected by a gyroscope in operable communication with the two-dimensional interface.

20. The computing system of claim 16, wherein the command is generated by a script executing time-based continual rotation of the interaction plane.

\* \* \* \* \*